G. R. SWINGLE.
Broom.

No. 159,861. Patented Feb. 16, 1875.

WITNESSES
Eugene W. Johnson
Geo. E. Upham

INVENTOR
George R. Swingle,
Chipman Hosmer &Co
ATTORNEYS

UNITED STATES PATENT OFFICE.

GEORGE R. SWINGLE, OF FREDERICKTOWN, OHIO.

IMPROVEMENT IN BROOMS.

Specification forming part of Letters Patent No. 159,861, dated February 16, 1875; application filed January 9, 1875.

*To all whom it may concern:*

Be it known that I, GEORGE R. SWINGLE, of Fredericktown, in the county of Knox and State of Ohio, have invented a new and valuable Improvement in Brooms; and I do hereby declare that the following is a full, clear, and exact description of the construction and operation of the same, reference being had to the annexed drawings, making a part of this specification, and to the letters and figures of reference marked thereon.

Figure 1:
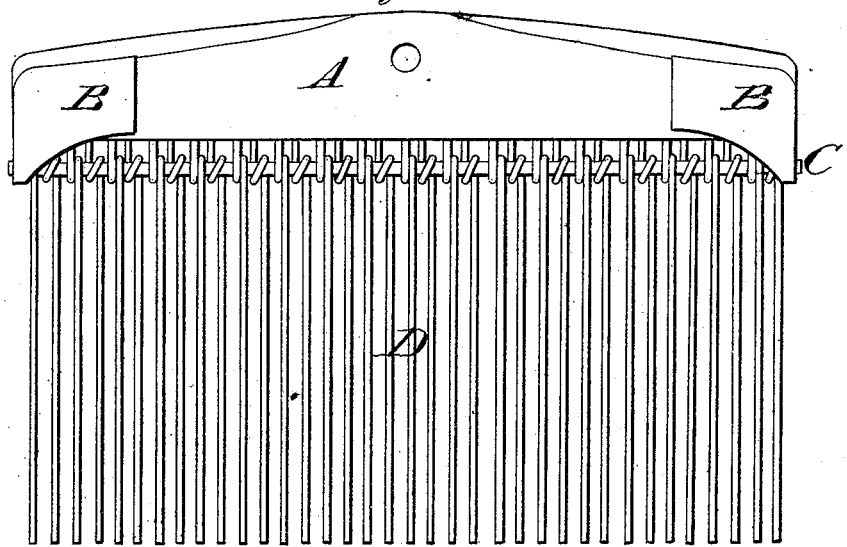
Figure 2:
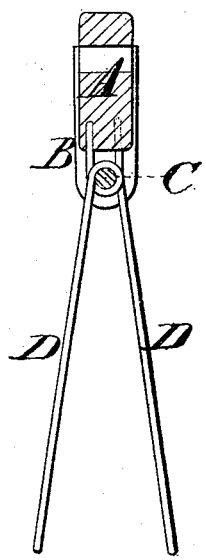

Figure 1 of the drawing is a representation of a front view of my broom; and Fig. 2 is a sectional view of the same.

This invention has relation to brooms for lawns, stables, and other purposes; and it consists in a novel manner of securing spring-wire teeth to a wooden head, whereby the teeth are firmly held and the broom is rendered very elastic and substantial, as will be understood from the following description.

In the annexed drawings, A designates the head of my improved broom, to the ends of which I rigidly secure metal caps B B, having ears formed on them, as shown in Fig. 1. C designates a rod, which is secured to the ears of caps B B, and around which the spring-wire teeth D are coiled. Each tooth is coiled once around the rod C, and the end of the tooth inserted into a hole made in the head A. The teeth are arranged in two rows on opposite sides of the rod C, as shown in Fig. 2, and the teeth of one row are arranged opposite the spaces between the teeth of the other row. The ends of the teeth are driven into the holes made in the head A, and the coils are all adjusted in the same line, after which the rod C is passed through the coils and its ends are secured to the ears of caps B, thereby completing the broom.

What I claim as new, and desire to secure by Letters Patent, is—

The spring-wire teeth D, coiled and inserted into the head A, in combination with the rod C and caps B, substantially as and for the purpose described.

In testimony that I claim the above I have hereunto subscribed my name in the presence of two witnesses.

GEORGE RIGOUR SWINGLE.

Witnesses:
C. W. EDWARDS,
C. D. HYLER.